(12) United States Patent
Yoshida

(10) Patent No.: US 9,764,766 B2
(45) Date of Patent: Sep. 19, 2017

(54) VEHICLE FRAME STRUCTURE

(71) Applicant: TOYOTA JIDOSHA KABUSHIKI KAISHA, Toyota-shi, Aichi-ken (JP)

(72) Inventor: Eiji Yoshida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/733,103

(22) Filed: Jun. 8, 2015

(65) Prior Publication Data

US 2015/0360725 A1 Dec. 17, 2015

(30) Foreign Application Priority Data

Jun. 13, 2014 (JP) ................................. 2014-122739

(51) Int. Cl.
  *B62D 21/15* (2006.01)
  *B62D 29/00* (2006.01)
  *B62D 25/04* (2006.01)

(52) U.S. Cl.
  CPC ........... *B62D 21/157* (2013.01); *B62D 25/04* (2013.01)

(58) Field of Classification Search
  CPC .............................. B62D 21/157; B62D 25/04
  USPC .................................................... 296/203.01
  See application file for complete search history.

(56) References Cited

U.S. PATENT DOCUMENTS

| 5,810,428 A | 9/1998 | Maki | |
| 7,963,588 B2 * | 6/2011 | Kanagai | B62D 21/157 |
| | | | 296/187.12 |
| 2010/0045072 A1 * | 2/2010 | Yamada | B62D 21/09 |
| | | | 296/204 |
| 2011/0210581 A1 * | 9/2011 | Kunishi | B62D 21/157 |
| | | | 296/193.01 |
| 2013/0241239 A1 | 9/2013 | Mori | |

FOREIGN PATENT DOCUMENTS

| JP | H08-26136 A | 1/1996 |
| JP | 2005-313685 A | 11/2005 |
| JP | 2010-064549 A | 3/2010 |
| JP | 2010-095176 A | 4/2010 |
| JP | 2012-121416 A | 6/2012 |
| JP | 2012206704 A * | 10/2012 |
| JP | 2013220807 A * | 10/2013 |
| JP | 2014-073769 A | 4/2014 |

* cited by examiner

*Primary Examiner* — Joseph D Pape
*Assistant Examiner* — Dana Ivey
(74) *Attorney, Agent, or Firm* — Oliff PLC

(57) ABSTRACT

A vehicle frame structure including: an elongated inner panel that is disposed at a vehicle cabin inner side of a vehicle body side section; an elongated outer panel that is disposed at the vehicle cabin outer side of the inner panel, and that, together with the inner panel, configures a frame by being joined to the inner panel; an elongated reinforcement member that is disposed at the vehicle cabin outer side or the vehicle cabin inner side of the outer panel, and that reinforces the outer panel by being joined to plural locations of the outer panel along the length direction; and a first excess length portion that is formed at the reinforcement member between adjacent joining portions between the reinforcement member and the outer panel, and that has excess length in a direction linking the joining portions.

9 Claims, 10 Drawing Sheets

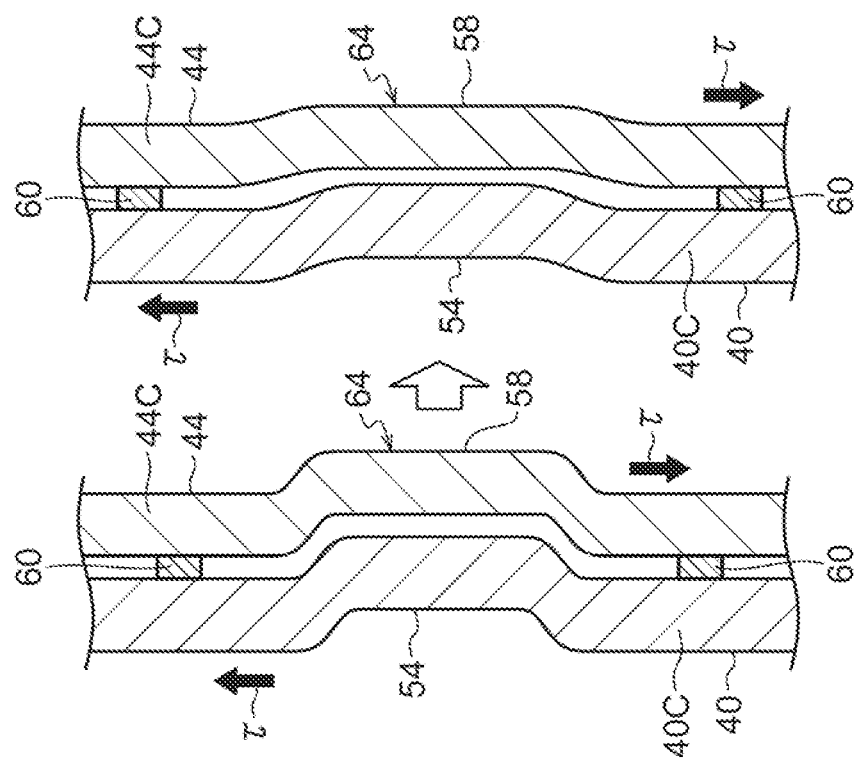
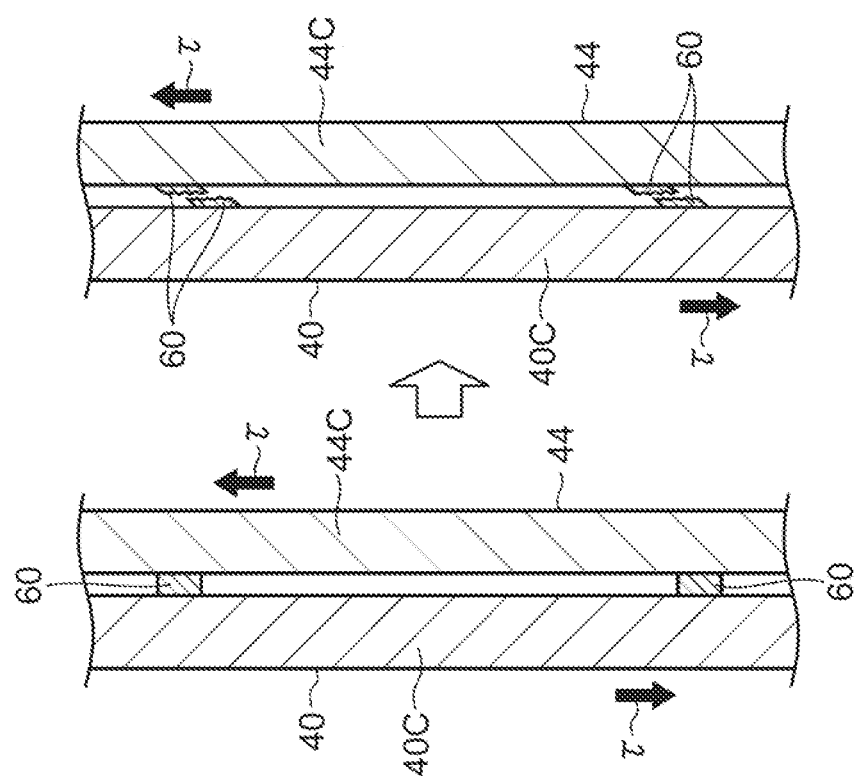
FIG.4A
FIG.4B

VEHICLE FRAME STRUCTURE

CROSS-REFERENCE TO RELATED APPLICATION

This application claims priority under 35 USC 119 from Japanese Patent Application, No. 2014-122739 filed Jun. 13, 2014, the disclosure of which is incorporated by reference herein.

BACKGROUND OF THE INVENTION

Technical Field

The present invention relates to a vehicle frame structure.

Related Art

Japanese Patent Application Laid-Open (JP-A) No. 2014-073769 describes an invention relating to a vehicle body structure, part of which uses a high-strength steel plate. To explain simply, a center pillar is configured by three members, these being a center pillar inner panel, center pillar outer reinforcement, and a side outer panel, disposed in this sequence from. Each of the members is formed with a hat shaped cross-section, and the center pillar is formed with a closed cross-section structure by spot welding in a state in which flange portions of the three members overlap with each other. In this related art, a corrugated portion is also formed between welding portions of the flange portion of the center pillar outer reinforcement sandwiched between the center pillar inner panel and the side outer panel, running along the length direction of the flange portion. Concentration of stress at spot weld portions (in particular, heat affected portions surrounding the weld portions at which strength is liable to be lower than other locations due to the spot welding) is thereby alleviated, due to tensile load acting on the flange of the center pillar outer reinforcement in the length direction thereof, and the corrugated portion undergoing extension deformation during a side-on collision.

SUMMARY

An additional reinforcement member is sometimes set at the center pillar in order to improve the durability of the center pillar during a side-on collision. For example a reinforcement member with a similar shape to the main body portion of the center pillar outer reinforcement is sometimes integrally formed to the center pillar outer reinforcement so as to cover the center pillar outer reinforcement at the vehicle cabin outer side of the main body portion by spot welding. Setting such a reinforcement member suppresses deformation of the center pillar during a side-on collision.

However, supposing a case in which the collision speed is high and the deformation amount of the center pillar toward the increases, there is a concern that stress concentrates at the joining portions between the reinforcement member and the center pillar outer reinforcement, causing the joining portions to break. In particular, since a combination of improved collision safety performance and lighter vehicle weight are now desired, a high-strength steel plate is sometimes used as the reinforcement member. However, high-strength steel plate does not extend easily and is liable to crack, such that improvement is desirable.

In consideration of the above circumstances, the present invention is to obtain a vehicle frame structure in which breaking is not liable to occur at a join portion between a frame structure member and its reinforcement member during a side-on collision.

Solution to Problem

A vehicle frame structure according to a first aspect of the present invention includes an elongated inner panel that is disposed at a vehicle cabin inner side of a vehicle body side section, an elongated outer panel that is disposed at a vehicle cabin outer side of the inner panel, and that, together with the inner panel, configures a frame by being joined to the inner panel, an elongated reinforcement member that is disposed at the vehicle cabin outer side or the of the outer panel, and that reinforces the outer panel by being joined to plural locations of the outer panel along the length direction, and a first excess length portion that is formed at the reinforcement member between adjacent joining portions between the reinforcement member and the outer panel, and that has excess length in a direction linking the joining portions.

Operation of the vehicle frame structure according to the first aspect is explained below.

In the event of a collision load from the vehicle body side acting on the vehicle body side section of the vehicle applied with the vehicle frame structure according to the first aspect, the outer panel of the frame disposed at the vehicle body side section attempts to undergo bending deformation toward the vehicle width direction inside, together with the inner panel. Thus the reinforcement member joined to the outer panel similarly attempts to undergo bending deformation.

In the first aspect, the first excess length portion is formed at the reinforcement member between the adjacent joining portions of the reinforcement member to the outer panel, and has excess length in the direction linking the joining portions. Thus when the reinforcement member attempts to undergo deformation accompanying bending deformation of the outer panel, the first excess length portion undergoes extension deformation. A portion of the collision load is thereby absorbed. This suppresses excessive stress from concentrating at the joining portions of the reinforcement member to the outer panel. Note that a case in which the first excess length portion deforms in the extension direction due to tensile force acting thereupon has been explained as an example. In cases in which compression force acts on the first excess length portion, the first excess length portion deforms in the compression direction, and concentration of excessive stress at the joining portions between the reinforcement member and the outer panel is suppressed.

A vehicle frame structure according to a second aspect of the present invention is the first aspect, wherein: the inner panel includes a first flange portion that runs along the length direction of the inner panel and is used for joining, the outer panel includes a second flange portion that runs along the length direction of the outer panel and is used for joining, the first flange portion and the second flange portion are joined at plural locations along the length directions of the inner panel and the outer panel, a second excess length portion that has excess length in a direction linking the joining portions together is formed between adjacent joining portions; and the first excess length portion is disposed at a position overlapping the second excess length portion as viewed along a vehicle width direction.

In the second aspect, the inner panel includes the first flange portion that runs along the length direction of the inner panel and is used for joining, and the outer panel includes the second flange portion that runs along the length direction of the outer panel and is used for joining. Thus the frame is configured by joining the first flange portion and the second flange portion at plural locations along the length directions of the inner panel and the outer panel.

In the second aspect, the second excess length portion that has excess length in a direction linking the joining portions together is formed between adjacent joining portions from out of the joining portions joining the first flange portion and the second flange portion. Thus a portion of the collision load is absorbed due the second excess length portion deforming in the extension direction or the compression direction when the first flange portion of the inner panel and the second flange portion of the outer panel undergo bending deformation. Thus excessive stress is suppressed from occurring at the joining portions between the first flange portion and the second flange portion.

In addition thereto, the first excess length portion is disposed at a position overlapping the second excess length portion as viewed along the vehicle width direction, thereby enabling the reinforcement member to be caused to undergo bending deformation in response to the bending deformation (corresponding to bending deformation) of the first flange portion and the second flange portion. The reinforcement member is accordingly suppressed or prevented from becoming detached from the outer panel, and the cross-section shape of the vehicle frame structure is less liable to collapse.

A vehicle frame structure according to a third aspect of the present invention is the first aspect or the second aspect, wherein the joining portions between the reinforcement member and the outer panel, and the first excess length portion, are disposed further to a vehicle width direction inside than a neutral axis of the frame configured by the inner panel and the outer panel.

In the third aspect, the joining portions between the reinforcement member and the outer panel, and the first excess length portion, are disposed further to the vehicle width direction inside than the neutral axis of the frame, such that tensile load is not only borne by the second excess length portion, but also by the first excess length portion. The first excess length portion and the second excess length portion therefore both undergo extension deformation due to the tensile force.

A vehicle frame structure according to a fourth aspect of the present invention is any one of the first aspect to the third aspect, wherein the inner panel, the outer panel, and the reinforcement member are each configured by a high-strength steel plate.

Operation of the fourth aspect is explained below.

Despite having high-strength, high-strength steel plates in general exhibit properties of being brittle and liable to crack or break. Thus in cases in which the inner panel, the outer panel, and the reinforcement member are configured by high-strength steel plates, stress concentrates and breaking is liable to occur at the joining portions between the first flange portion and the second flange portion, and at the joining portions between the reinforcement member and the outer panel. However, the first excess length portion (and the second excess length portion) is provided in the present invention, thereby enabling the occurrence of breaking at the join portion to be suppressed or prevented.

As explained above, the vehicle frame structure according to the first aspect of the present invention exhibits an advantageous effect of enabling breaking to be less liable to occur at joining portions between the frame structure member and its reinforcement member in the event of a side-on collision.

The vehicle frame structure according to the second aspect of the present invention exhibits an excellent advantageous effect of enabling the cross-section rigidity of the frame including the reinforcement member to maintained for longer during a side-face collision.

The vehicle frame structure according to the third aspect of the present invention exhibits an excellent advantageous effect of enabling breaking or the like due to tensile force to be effectively suppressed or prevented during bending deformation of the frame including the reinforcement member.

The vehicle frame structure according to the fourth aspect of the present invention exhibits excellent advantageous effects of enabling durability to be improved during a side-on collision, and enabling the number of components to be reduced.

BRIEF DESCRIPTION OF THE DRAWINGS

Embodiments of the present invention will be described in detail based on the following figures, wherein:

FIG. 4A is a schematic cross-section illustrating a state before and after deformation when a shear force $\tau$ acts in the extension direction on a first flange portion and a second flange portion during a side-on collision, in a Comparative Example in which second excess length portions are not formed;

FIG. 4B is a schematic cross-section illustrating a state before and after deformation when a shear force $\tau$ acts in the extension direction on a first flange portion and a second flange portion during a side-on collision, in the present exemplary embodiment in which second excess length portions are formed;

DETAILED DESCRIPTION OF THE INVENTION

Explanation follows regarding several exemplary embodiments of a vehicle frame structure according to the present invention, with reference to FIG. 1 to FIG. 10. Note that in each of the drawings as appropriate, the arrow FR indicates the vehicle front side, the arrow UP indicates the vehicle upper side, and the arrow IN indicates the vehicle width direction inside.

Figure 3:
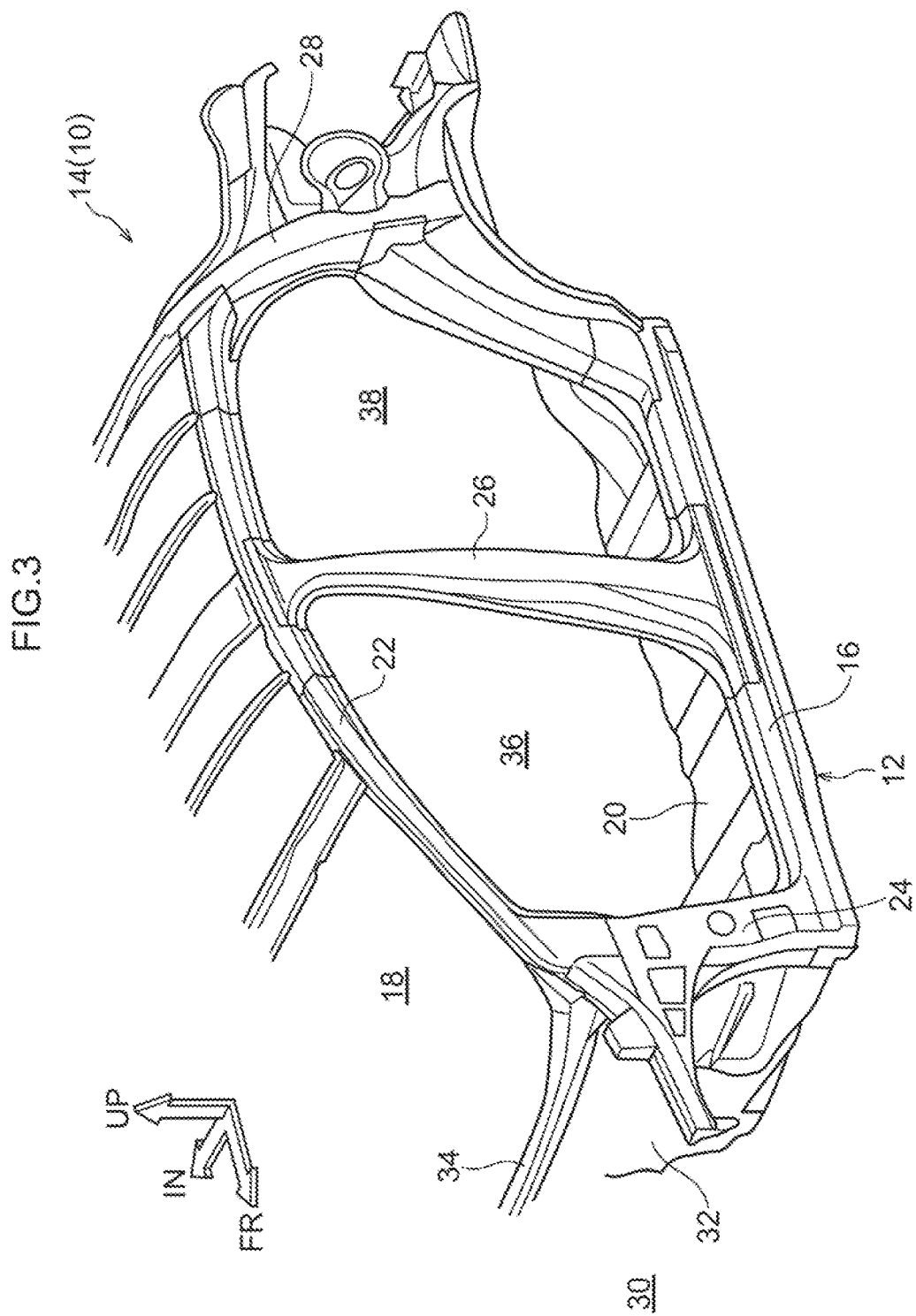
FIG. 3 is a perspective view centered on a vehicle body front section of a vehicle body of a vehicle applied with a vehicle frame structure according to the present exemplary embodiment.

FIG. 3 is a perspective view illustrating a vehicle body 14 of a vehicle (automobile) 10, centered on a vehicle body side section 12. As illustrated in FIG. 3, a rocker 16 is disposed running along the vehicle front-rear direction at a lower end portion of the vehicle body side section 12. The rocker 16 is an elongated vehicle body frame member with a closed cross-section structure, and is disposed with its length direction running along the vehicle front-rear direction at each vehicle width direction outside end portion of a vehicle body floor 20 configuring a lower section of a cabin 18.

A roof side rail 22 is disposed running along the vehicle front-rear direction at an upper end portion of each of the vehicle body side sections 12. The roof side rail 22 is an elongated vehicle body frame member with a closed cross-section structure, and is disposed with its length direction running along substantially the vehicle front-rear direction at each vehicle width direction outside end portion of a roof panel, not illustrated in the drawings, configuring an upper section of the cabin 18.

The rockers 16 and the roof side rails 22 described above are respectively coupled together along the vehicle up-down direction by three pillars, these being a front pillar 24, a center pillar 26, and a rear pillar 28. The front pillar 24 is an elongated (column shaped) vehicle body frame member with a closed cross-section structure, and couples a front end portion of the rocker 16 and a front end portion of the roof side rail 22 along the vehicle up-down direction. Note that a dash panel 32, partitioning between a power unit chamber 30 and the cabin 18, is disposed between the left and right front pillars 24. An upper end portion of the dash panel 32 is joined to a gutter shaped cowl 34 disposed running along the vehicle width direction along a lower end portion of windshield, not illustrated in the drawings. The rear pillar 28 is also an elongated (column shaped) vehicle body frame member with a closed cross-section structure, and couples a rear end portion of the rocker 16 and a rear end portion of the roof side rail 22 along the vehicle up-down direction.

The center pillar 26 is an elongated (column shaped) vehicle body frame member with a closed cross-section structure, and couples a length direction intermediate portion of the rocker 16 and a length direction intermediate portion of the roof side rail 22 along the vehicle up-down direction. A front side door opening 36 opened and closed by a front side door, not illustrated in the drawings, and a rear side door opening 38 opened and closed by a rear side door, not illustrated in the drawings, are formed to the vehicle body side section 12 due to placement of the center pillar 26.

An outline of the frame structure of the vehicle body side section 12 of the vehicle body 14 of the vehicle 10 has been explained above. More detailed explanation follows regarding a structure of the center pillar 26.

Figure 1:
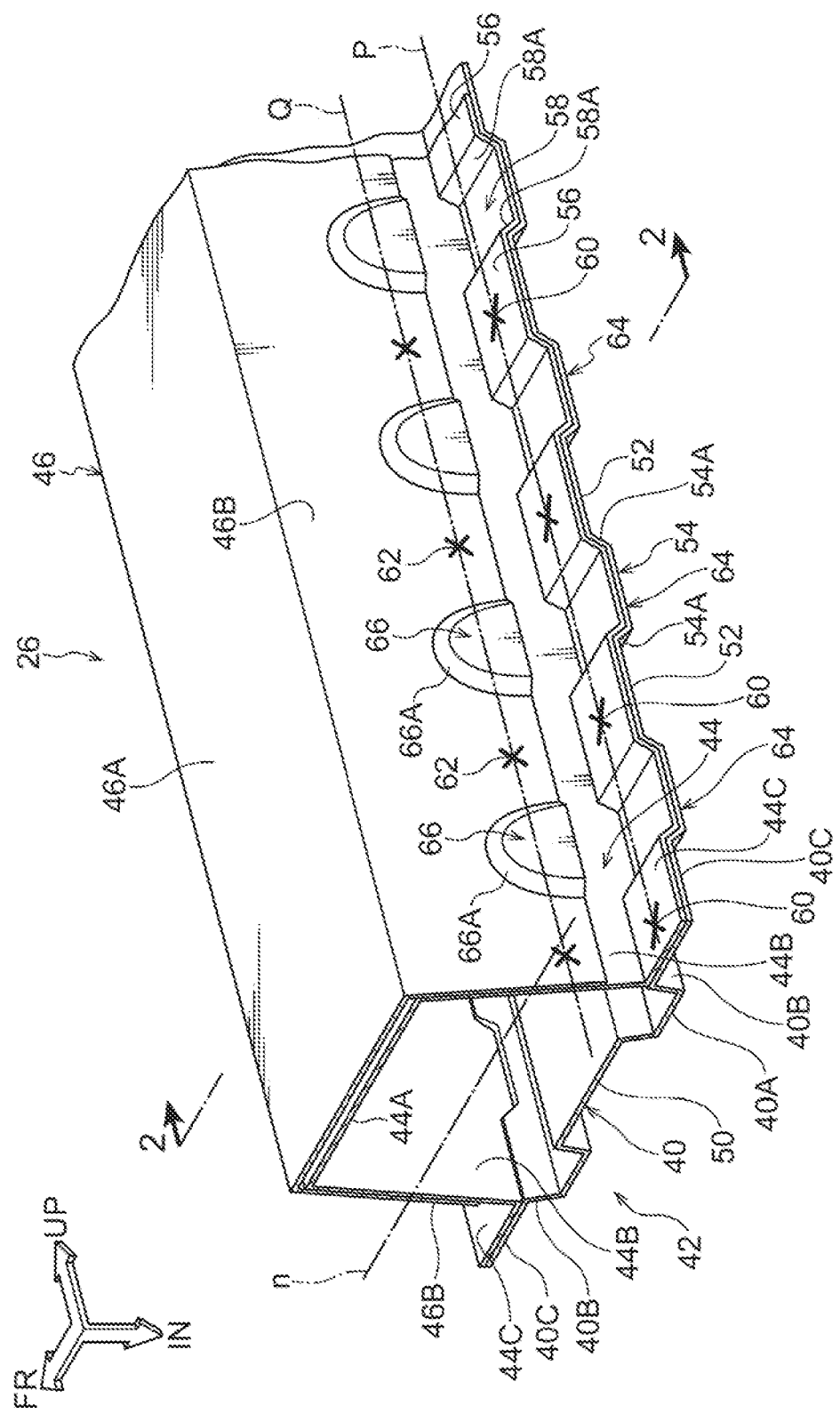
FIG. 1 is an enlarged perspective view illustrating a center pillar applied with a vehicle frame structure according to an exemplary embodiment.
Figure 2:
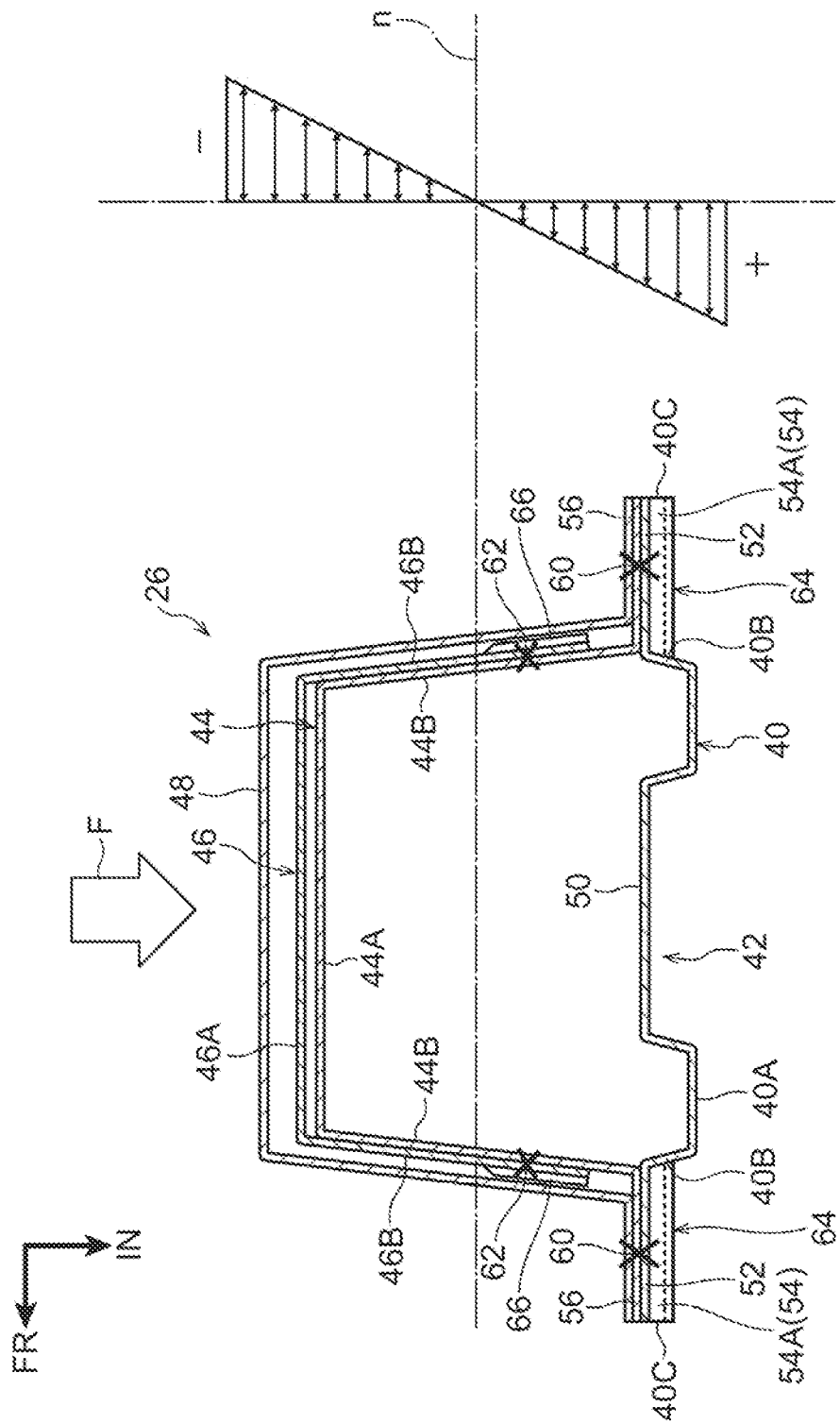
FIG. 2 is a plan view cross-section of the center pillar illustrated in FIG. 1, illustrating a cross-section profile taken along the horizontal direction of the center pillar, together with a stress distribution graph.

As illustrated in FIG. 1 and FIG. 2, each of the center pillars 26 is configured including an elongated center pillar inner panel (hereafter simply referred to as "pillar inner panel") 40 disposed at the of the vehicle body side section 12, a center pillar outer panel (hereafter simply referred to as "pillar outer panel") 44 disposed at the vehicle cabin outer side of the pillar inner panel 40 and forming a frame 42, together with the pillar inner panel 40, by being joined to the pillar inner panel 40. The center pillar 26 is also configured including center pillar outer reinforcement (hereafter simply referred to as "pillar outer reinforcement") 46 disposed at the vehicle cabin outer side of the pillar outer panel 44 and acting as an elongated reinforcement member reinforcing the pillar outer panel 44 by being joined to the pillar outer panel 44 at plural locations along the length direction. The pillar inner panel 40, the pillar outer panel 44, and the pillar outer reinforcement 46 are each configured by a high-strength steel plate (high tensile strength steel sheet). A side outer panel 48, configuring an outer panel of the vehicle body side section 12, is disposed at the vehicle cabin outer side of the pillar outer reinforcement 46 (see FIG. 2). To explain further, in the present specification, "high-strength steel plate" refers to a steel plate with a higher tensile strength than a normal steel plate, and mainly refers to high tensile steel plates with a tensile strength from 440 MPa to 790 MPa; however this does not exclude extra-high tensile steel plates with a tensile strength of 980 MPa or above.

Specifically, a cross-section of the pillar inner panel 40 taken along a direction orthogonal to the length direction configures a shallow bottomed substantial hat shape, configured by a bottom wall portion 40A, a pair of front and rear vertical wall portions 40B, and a pair of front and rear first flange portions 40C. The bottom wall portion 40A is disposed running along the vehicle front-rear direction and the vehicle up-down direction, and is integrally formed with a bulging portion 50 bulging out toward the vehicle width direction outside at a vehicle front-rear direction intermediate portion thereof. The pair of front and rear vertical wall portions 40B are formed bending toward the vehicle width direction outside from vehicle front-rear direction end portions of the bottom wall portion 40A. The first flange portions 40C are formed bending toward the vehicle front side and the vehicle rear side from respective vehicle width direction outside end portions of the pair of front and rear vertical wall portions 40B.

A cross-section of the pillar outer panel 44 taken along a direction orthogonal to the length direction configures a deep bottomed substantial hat shape, configured by a bottom wall portion 44A, a pair of front and rear vertical wall portions 44B, and a pair of front and rear second flange portions 44C. The bottom wall portion 44A is disposed running along the vehicle front-rear direction and the vehicle up-down direction. The pair of front and rear vertical wall portions 44B are formed bending toward the vehicle width direction inside from vehicle front-rear direction end portions of the bottom wall portion 44A. The second flange portions 44C are formed bending toward the vehicle front side and the vehicle rear side from respective vehicle width direction inside end portions of the pair of front and rear vertical wall portions 44B.

Plural first seat face portions 52 disposed running along the length direction of the pillar inner panel 40 at a specific pitch and used for joining, and first recessed beads 54 formed between adjacent first seat face portions 52, are formed to the first flange portions 40C repeated in succession along the length direction of the first flange portions 40C. The first seat face portions 52 are formed with rectangular flat plate shapes, and the first recessed beads 54 are formed with trapezoidal shapes.

Corresponding thereto, plural second seat face portions 56 disposed running along the length direction of the pillar outer panel 44 at the same pitch as the first seat face portions 52 and used for joining, and second recessed beads 58 formed between adjacent second seat face portions 56, are formed to the second flange portions 44C repeated in succession along the length direction of the second flange portions 44C. The second seat face portions 56 are formed with rectangular flat plate shapes overlapping the first seat face portions 52, and the second recessed beads 58 are formed with trapezoidal shapes overlapping the first recessed beads 54.

The first seat face portions 52 and the second seat face portions 56 described above are joined together by welding (spot welding). Locations where the first seat face portions 52 are joined to the second seat face portions 56 are referred to below as "first joining portions 60". The pillar inner panel 40 and the pillar outer panel 44 thereby form an integral unit, forming the frame 42 with a substantially rectangular shaped closed cross-section structure.

The first recessed beads 54 and respective second recessed beads 58 abut each other without being joined to each other. The first recessed beads 54 and the second recessed beads 58 are deformed in the plate thickness direction with respect to the first flange portions 40C and the second flange portions 44C, and have excess length along the direction in which the adjacent first joining portions 60 (or second joining portions 62) are linked to each other (the direction of the single-dotted dashed line P in FIG. 1). The first recessed beads 54 and the second recessed beads 58 are collectively referred to below as "second excess length portions 64". Note that the excess length is configured by sloped portions 54A of the first recessed beads 54, and sloped portions 58A of the second recessed beads 58 overlapping the sloped portions 54A. Thus the sloped portions 54A, 58A are elements that may be understood to be excess length forming portions. To explain further, the second excess length portions "having excess length along the direction in which the joining portions are linked to each other" refers to deviating portions that do not trace the line linking the respective joining portions to each other (line P).

A cross-section of the pillar outer reinforcement 46 taken along a direction orthogonal to the length direction configures a deep bottomed substantial U shape, configured by a bottom wall portion 46A, and a pair of front and rear vertical wall portions 46B. The pillar outer reinforcement 46 is fitted onto the pillar outer panel 44 from the vehicle cabin outer side. The width direction dimension running along the vehicle width direction of the vertical wall portions 46B is set shorter than the width direction dimension running along the vehicle width direction of the vertical wall portions 44B of the pillar outer panel 44. end portions of the vertical wall portions 46B are joined by welding (spot welding) to the vertical wall portions 44B of the pillar outer panel 44 at the same pitch as the first joining portions 60. Locations where the pillar outer reinforcement 46 is joined to the pillar outer panel 44 are referred to below as "second joining portions 62". The pillar outer reinforcement 46 thereby configures an integral unit with the pillar outer panel 44 at the vehicle cabin outer side of the pillar outer panel 44, and reinforces the pillar outer panel 44.

Substantially semi-elliptical shaped first excess length portions 66 are formed to the vertical wall portions 46B of the pillar outer reinforcement 46 between adjacent second joining portions 62. The first excess length portions 66 bulge out on progression toward the cross-section outside of the pillar outer reinforcement 46, and are formed from end edges of the vertical wall portions 46B to positions partway along the vertical wall portions 46B. Similarly to the second excess length portions 64 previously described, the first excess length portions 66 are deformed in the plate thickness direction of the vertical wall portions 46B, and have excess length along the direction in which the adjacent second joining portions 62 are linked to each other (the direction of the single-dotted dashed line Q in FIG. 1). Note that the excess length is configured by sloped portions 66A formed to outer peripheral portions of the first excess length portions 66. Thus the sloped portions 66A are elements that may be understood to be excess length forming portions. To explain further, the first excess length portions "having excess length along the direction in which the joining portions are linked to each other" refers to deviating portions that do not trace the line linking the respective joining portions to each other (line Q).

Viewed along the vehicle width direction, the first excess length portions 66 described above are disposed in positions overlapping the second excess length portions 64. The second joining portions 62 of the pillar outer reinforcement 46 to the pillar outer panel 44 and the first excess length portions 66 are disposed further to the vehicle width direction inside than a neutral axis n of the frame 42 configured by the pillar inner panel 40 and the pillar outer panel 44 (see FIG. 2).

Operation and Advantageous Effects of Present Exemplary Embodiment

Explanation follows regard operation and advantageous effects of the present exemplary embodiment.

In the event that a collision load from the vehicle width direction outside is input at comparatively high speed (such as 60 km/h) to the vehicle body side section 12 of the vehicle 10 applied with the vehicle frame structure according to the present exemplary embodiment, the frame 42 of the center pillar 26 attempts to undergo bending deformation toward the vehicle width direction inside. Thus as in the Comparative Example schematically illustrated in FIG. 4A, it is conceivable that a shear force τ acts between the first flange portions 40C of the pillar inner panel 40 and the second flange portions 44C of the pillar outer panel 44, causing the first joining portions 60, which are the joining portions between the first joining portions 60 of the first flange portions 40C and the second joining portions 62 of the second flange portions 44C, to break.

Figure 5A:
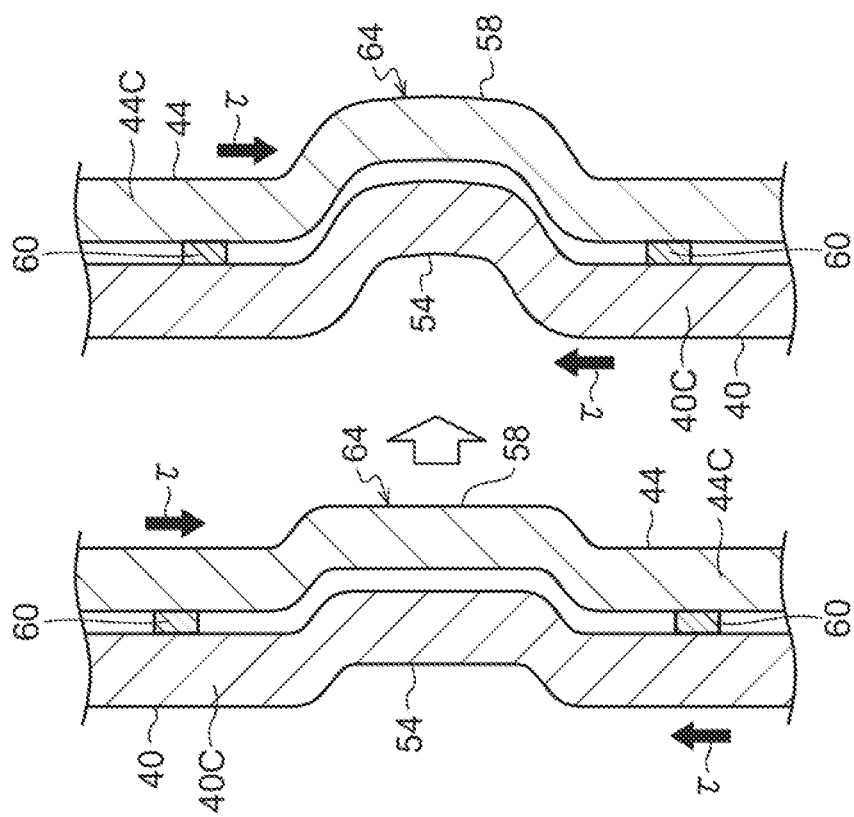
FIG. 5A is a schematic cross-section illustrating a state before and after deformation when a shear force $\tau$ acts in the compression direction on a first flange portion and a second flange portion during a side-on collision, in a Comparative Example in which second excess length portions are not formed.
Figure 5B:
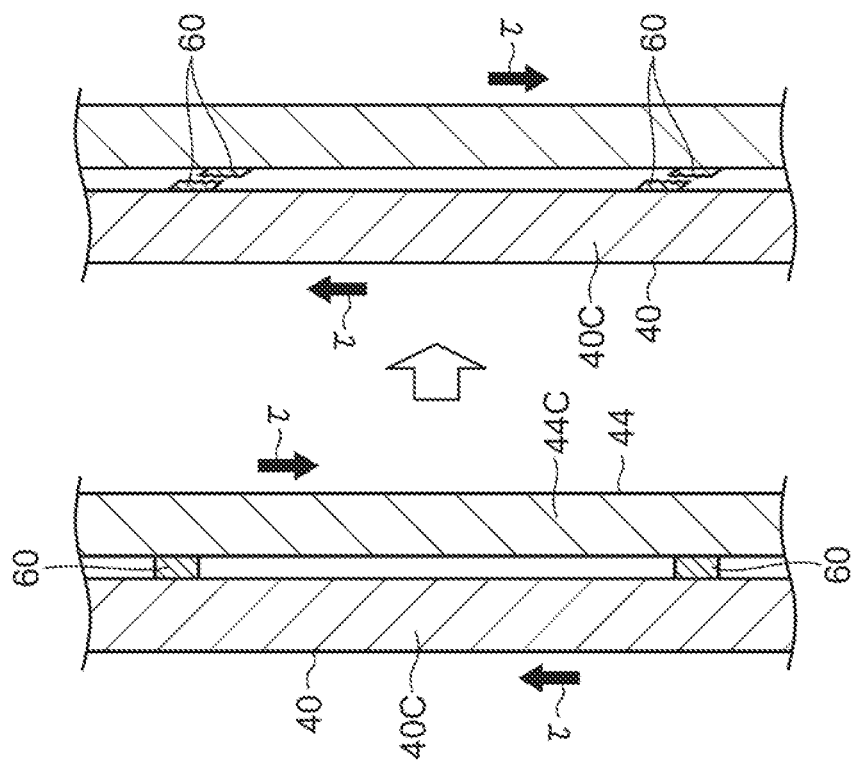
FIG. 5B is a schematic cross-section illustrating a state before and after deformation when a shear force $\tau$ acts in the compression direction on a first flange portion and a second flange portion during a side-on collision, in the present exemplary embodiment in which second excess length portions are formed.

However, in the present exemplary embodiment as illustrated in FIG. 4B, since the second excess length portions 64 are set to the first flange portions 40C and the second flange portions 44C, concentration of stress at the first joining portions 60 is alleviated due to extension deformation of the second excess length portions 64. Note that, in cases in which the first flange portions 40C and the second flange portions 44C bear shear force τ in the compression direction thereof as illustrated in FIG. 5A, concentration of stress on the first joining portions 60 is alleviated due to compression deformation of the second excess length portions 64 as illustrated in FIG. 5B.

Deformation behavior focusing on the frame 42 of the center pillar 26 has been explained above. However, when the pillar outer panel 44 undergoes bending deformation, this is accompanied by the pillar outer reinforcement 46 joined to the vehicle cabin outer side of the pillar outer panel 44 also attempting to undergo bending deformation.

Figure 6A:
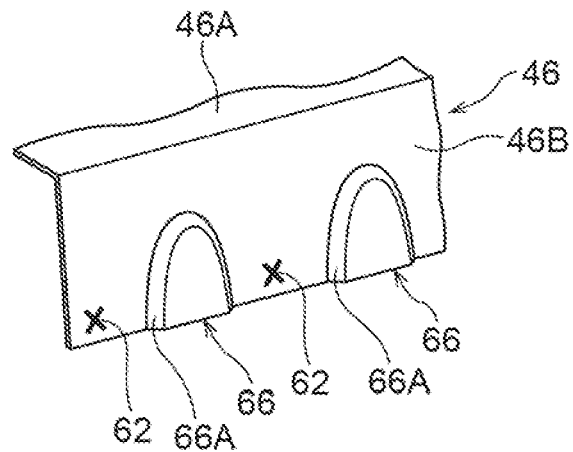
FIG. 6A is a partial perspective view illustrating a state before deformation of pillar outer reinforcement.
Figure 6B:
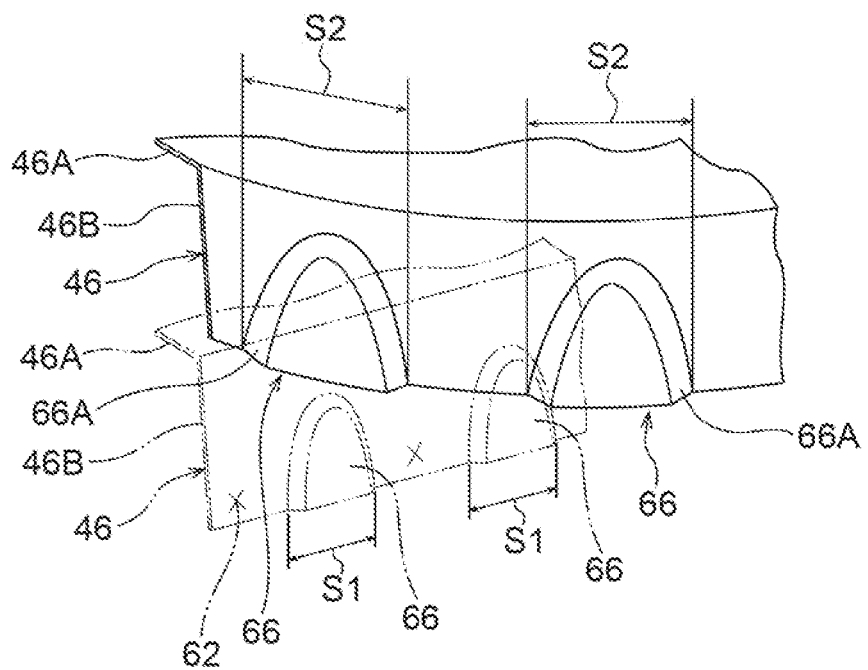
FIG. 6B is a partial perspective view illustrating a state after extension deformation of pillar outer reinforcement.

In the present exemplary embodiment, the first excess length portions 66 having excess length in the direction linking the second joining portions 62 to each other (the direction of the single-dotted dashed line Q direction in FIG. 1) are provided between the second joining portions 62, which are the joining portions between the pillar outer reinforcement 46 and the pillar outer panel 44. Thus when the pillar outer reinforcement 46 attempts to undergo deformation accompanying bending deformation of the pillar outer panel 44 as illustrated in FIG. 6A, the first excess length portions 66 undergo extension deformation toward the acting load direction, as illustrated in FIG. 6B. This suppresses excessive stress from concentrating at the second joining portions 62 between the pillar outer reinforcement 46 and the pillar outer panel 44. Note that a case in which the first excess length portions 66 deform in the extension direction due to tensile force acting thereupon has been explained above as an example. In cases in which compression force acts on the first excess length portions 66, the first excess length portions 66 deform in the compression direction, and concentration of excess stress at the second joining portions 62 between the pillar outer reinforcement 46 and the pillar outer panel 44 is suppressed.

The vehicle frame structure according to the present exemplary embodiment thereby exhibits the advantageous effect that breaking is less liable to occur at the second joining portions 62 that are the joining portions between the pillar outer panel 44 of the center pillar 26 and its pillar outer reinforcement 46, in the event of a side-on collision.

The pillar inner panel 40 includes the first flange portions 40C running along the length direction thereof and used for joining, and the pillar outer panel 44 includes the second flange portions 44C running along the length direction thereof and used for joining. The frame 42 is accordingly configured by joining the first flange portions 40C and the second flange portions 44C at plural locations running along the length directions of the pillar inner panel 40 and the pillar outer panel 44.

In the present exemplary embodiment, the second excess length portions 64 are formed between the adjacent first joining portions 60 out of the first joining portions 60 joining the first seat face portions 52 to the second seat face portions 56, with excess length in the direction linking the first joining portions 60 to each other. Thus a portion of the collision load is absorbed due the second excess length portions 64 deforming in the extension direction or the compression direction when the pillar outer panel 44 and the pillar inner panel 40 undergo bending deformation. Thus excessive stress is suppressed from occurring at the first joining portions 60 between the first flange portions 40C and the second flange portions 44C.

In addition thereto, the first excess length portions 66 are disposed in positions overlapping the second excess length portions 64 as viewed along the vehicle width direction, thereby enabling the pillar outer reinforcement 46 to be caused to undergo bending deformation in response to the bending deformation of the first flange portions 40C and the second flange portions 44C. Thus the pillar outer reinforcement 46 is suppressed or prevented from becoming detached from the pillar outer panel 44. The cross-section shape of the center pillar 26 is therefore less liable to collapse.

Thus the present exemplary embodiment enables the cross-section rigidity of the frame 42 including the pillar outer reinforcement 46 to be maintained for longer during a side-face collision.

In the present exemplary embodiment, the second joining portions 62 between the pillar outer reinforcement 46 and the pillar outer panel 44, and the first excess length portions 66, are disposed further to the vehicle width direction inside than the neutral axis n of the frame 42, such that tensile load is not only borne by the second excess length portions 64, but also by the first excess length portions 66. The first excess length portions 66 and the second excess length portions 64 therefore both undergo extension deformation due to the tensile force. Thus the present exemplary embodiment enables breaking or the like due to tensile force to be effectively suppressed or prevented during bending deformation of the frame 42 including the pillar outer reinforcement 46.

The present exemplary embodiment also exhibits the below advantageous effect. Despite having high-strength, high-strength steel plates in general exhibit properties of being brittle and liable to crack or break. Thus in cases in which the pillar inner panel 40, the pillar outer panel 44, and the pillar outer reinforcement 46 are configured by high-strength steel plates as in the present exemplary embodiment, stress concentrates and breaking is liable to occur at the first joining portions 60 between the first flange portions 40C and the second flange portions 44C, and at the second joining portions 62 between the pillar outer reinforcement 46 and the pillar outer panel 44. However, the first excess length portions 66 and the second excess length portions 64 are provided in the present exemplary embodiment, thereby enabling the occurrence of breaking at the first joining portions 60 and the second join portions 62 to be suppressed or prevented. Thus the present exemplary embodiment enables durability of the center pillar 26 to be improved during a side-on collision, and enables the number of components to be reduced.

OTHER EXEMPLARY EMBODIMENTS

Explanation follows regarding several other exemplary embodiments. Note that the same reference numerals are applied to configuration portions that are similar to those in the exemplary embodiment described above, and explanation thereof is omitted.

Figure 7:
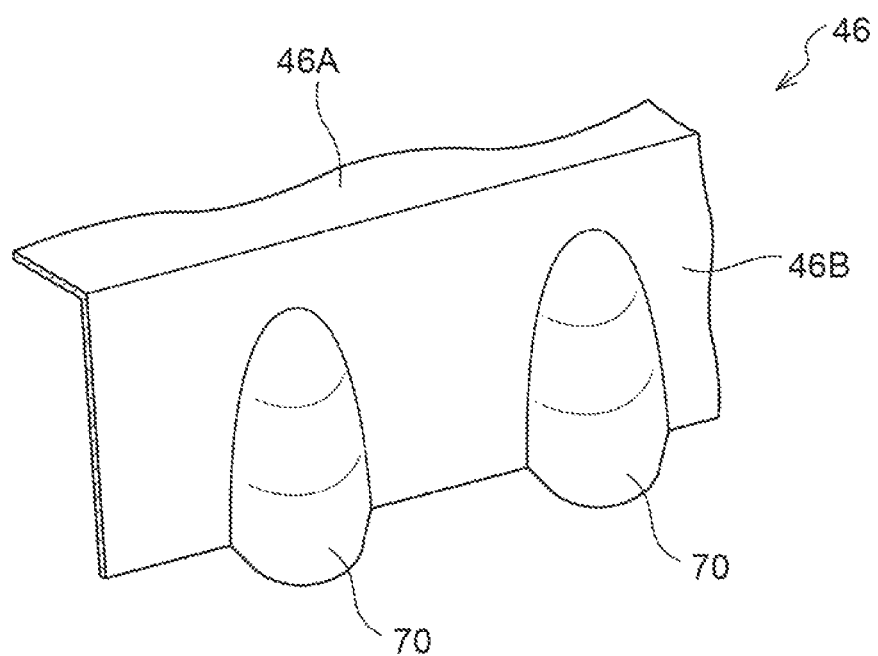
FIG. 7 is a partial perspective view of pillar outer reinforcement corresponding to FIG. 6A, illustrating another exemplary embodiment of first excess length portions.

In the exemplary embodiment illustrated in FIG. 7, first excess length portions 70, bulging out in substantially semi-circular cylindrical shapes so as to include the end edges of the vertical wall portions 46B, are integrally formed to the vertical wall portions 46B of the pillar outer reinforcement 46. The first excess length portions 70 are formed running along the length direction of the pillar outer reinforcement 46 at a specific pitch. Note that, although not illustrated in the drawings, second joining portions are set between adjacent first excess length portions 70 by spot welding. In this configuration, the first excess length portions 70 are capable of extension deformation and compression deformation along the length direction of the vertical wall portions 46B of the pillar outer reinforcement 46, thereby enabling stress occurring at the second joining portions to be alleviated.

Figure 8:
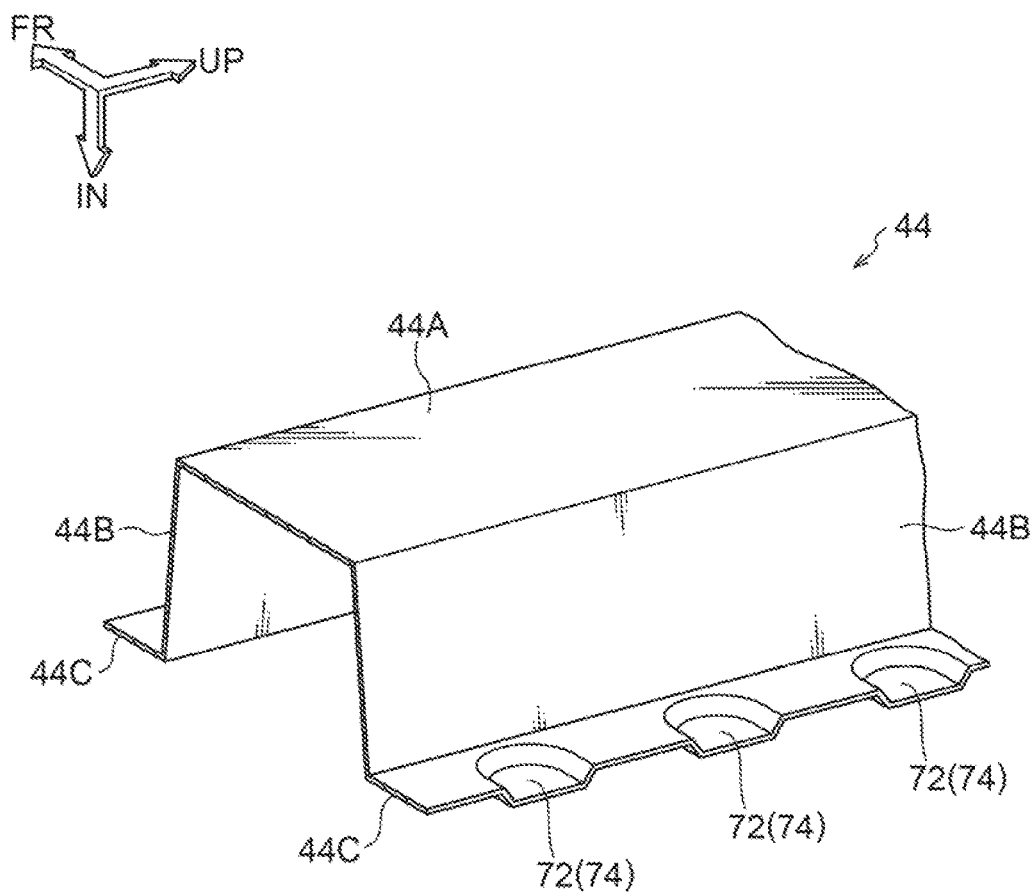
FIG. 8 is a partial perspective view illustrating a pillar outer panel of a (first) other exemplary embodiment of second excess length portions.

In the exemplary embodiment illustrated in FIG. 8, second recessed beads 72 are integrally formed to the second flange portions 44C of the pillar outer panel 44. The second recessed beads 72 protrude out in dish shapes toward the opposite side to the vertical wall portions 44B, and are formed in substantially semi-circular shapes as viewed from the vehicle width direction outside. Note that similarly shaped first recessed beads are integrally formed to the second recessed beads 72 at the pillar inner panel side, not illustrated in the drawings. Second excess length portions 74 are formed by the first recessed beads and the second recessed beads 72. Note that, although not illustrated in the drawings, first joining portions are set between adjacent second excess length portions 74 by spot welding. The second excess length portions 74 also exhibit similar deformation behavior to the previously described second excess length portions 64 illustrated in FIG. 1, and enable stress occurring at the first joining portions to be alleviated.

Figure 9A:
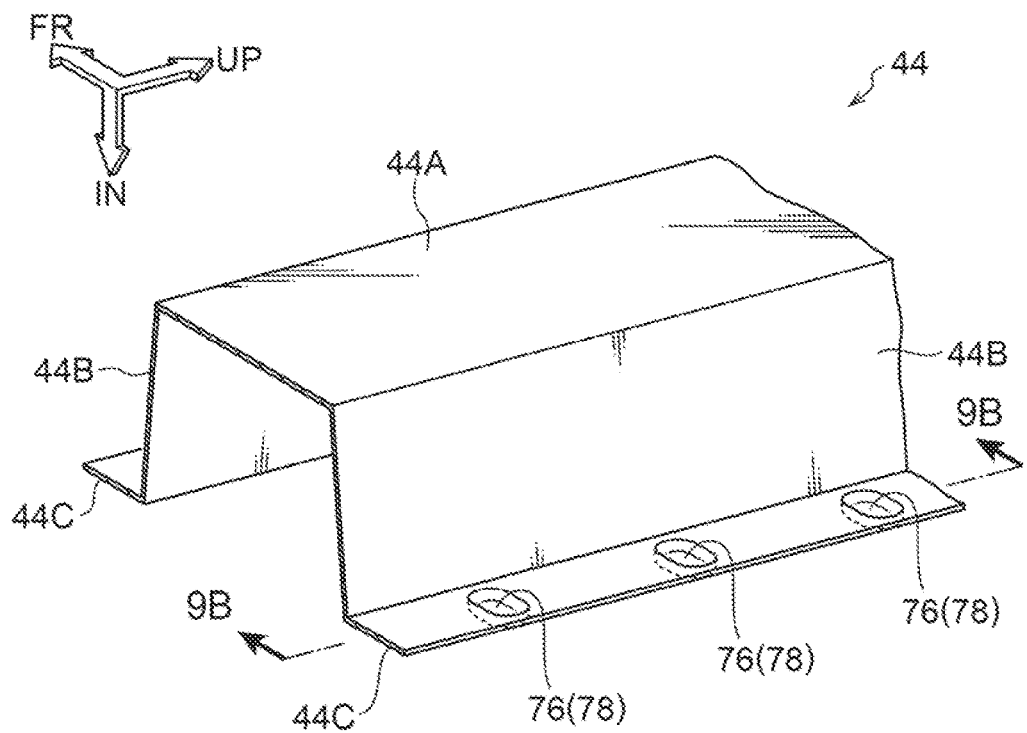
FIG. 9A is a partial perspective view illustrating a pillar outer panel of a (second) other exemplary embodiment of second excess length portions.
Figure 9B:
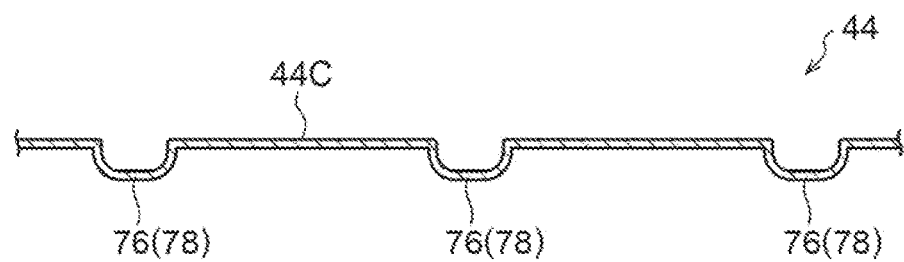
FIG. 9B is a cross-section taken along line 9B-9B in FIG. 9A.

In the exemplary embodiment illustrated in FIG. 9A and FIG. 9B, second recessed beads 76, which are circular shaped viewed from the vehicle width direction outside, are integrally formed to the second flange portions 44C of the pillar outer panel 44. Note that similarly shaped first recessed beads are integrally formed to the second recessed beads 76 at the pillar inner panel side, not illustrated in the drawings. Second excess length portions 78 are formed by the first recessed beads and the second recessed beads 76. Note that, although not illustrated in the drawings, first joining portions are set between adjacent second recessed beads 76 by spot welding. The second excess length portions 78 also exhibit substantially similar deformation behavior to the previously described second excess length portions 64 illustrated in FIG. 1, and enable stress occurring at the first joining portions to be alleviated.

Figure 10A:
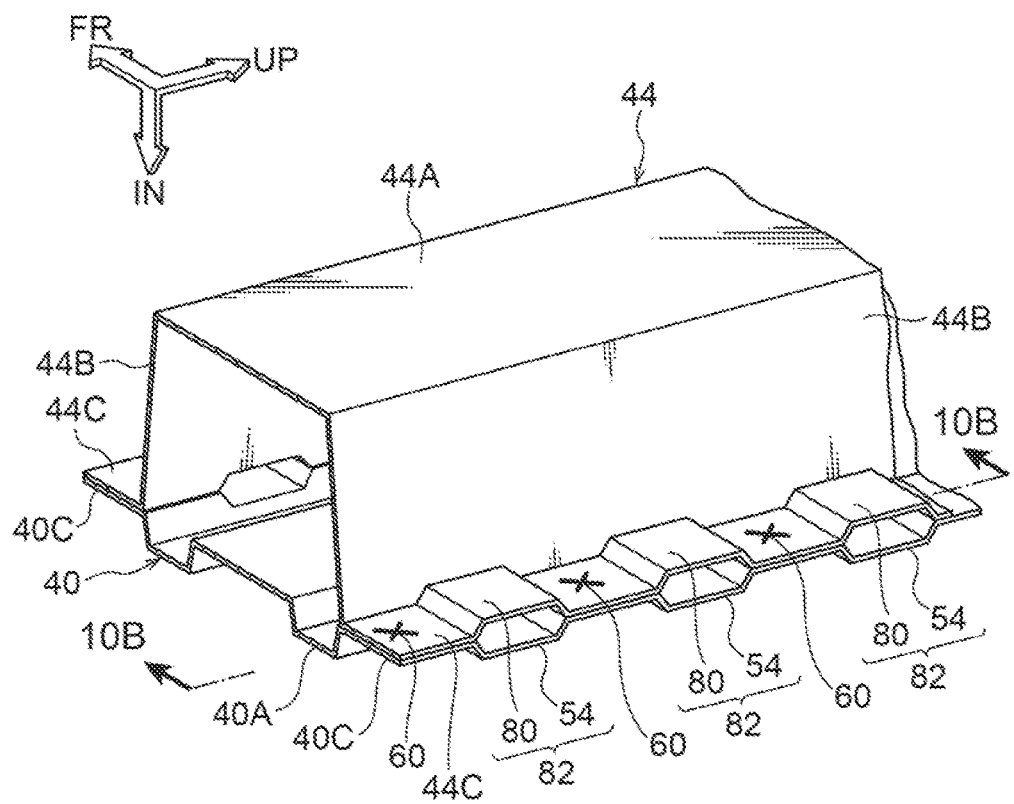
FIG. 10A is a partial perspective view illustrating a pillar inner panel and a pillar outer panel of a (third) other exemplary embodiment of second excess length portions.
Figure 10B:
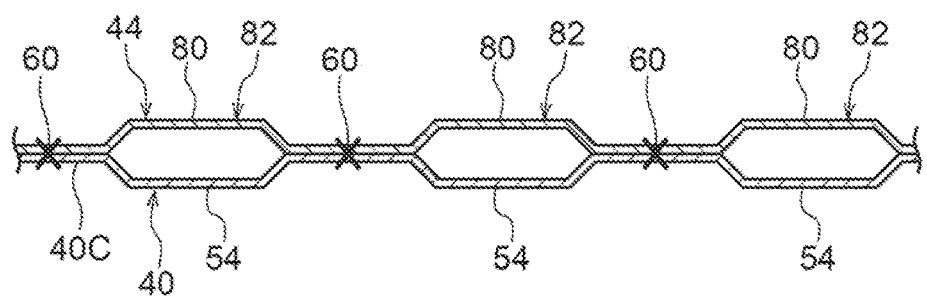
FIG. 10B is a cross-section taken along line 10B-10B in FIG. 10A.

In the exemplary embodiment illustrated in FIG. 10A and FIG. 10B, protruding beads 80, protruding out at the opposite side to the first recessed beads 54 formed at the first flange 40C side of the pillar inner panel 40, are integrally formed to the second flange portions 44C of the pillar outer panel 44. The protruding beads 80 are disposed facing the first recessed beads 54 and the plate thickness directions of the first flange portions 40C and the second flange portions 44C. Second excess length portions 82 are formed by the first recessed beads 54 and the protruding beads 80. The second excess length portions 82 also exhibit substantially similar deformation behavior to the previously described second excess length portions 64 illustrated in FIG. 1, and enable stress occurring at the first joining portions to be alleviated.

Note that although the present invention is applied to the center pillar 26 in the present exemplary embodiments, there is no limitation thereto, and the present invention may be applied to a vehicle frame member such as the front pillar 24, the rear pillar 28, the rocker 16, or the roof side rail 22.

Although the pillar inner panel 40, the pillar outer panel 44, and the pillar outer reinforcement 46 are all configured by high-strength steel plates in the present exemplary embodiments, there is no limitation thereto, and any one or two members may be configured by high-strength steel plates, or all members may be configured by normal steel plates that are not high-strength steel plates.

Although the pillar outer reinforcement 46 is disposed at the vehicle cabin outer side of the pillar outer panel 44 in the present exemplary embodiments, there is no limitation thereto, and pillar outer reinforcement may be disposed at the of a pillar outer panel.

What is claimed is:

1. A vehicle frame structure comprising:
   an elongated inner panel that is disposed at a vehicle cabin inner side of a pillar that couples together, in a vehicle up-down direction, (i) a rocker that is disposed running along a vehicle front-rear direction at a lower end portion of a vehicle body side section and (ii) a roof side rail that is disposed running along the vehicle front-rear direction at an upper end portion of the vehicle body side section;
   an elongated outer panel that is disposed at a vehicle cabin outer side of the inner panel, and that, together with the inner panel, configures a frame by a second flange portion formed running along a length direction of the outer panel being joined to a first flange portion formed running along a length direction of the inner panel, at a plurality of locations along the length direction of the inner and outer panels;
   an elongated reinforcement member that is disposed at the vehicle cabin outer side or the vehicle cabin inner side of the outer panel, and that overlaps a part of the outer panel and is joined to the outer panel at a plurality of locations along the length direction of the outer panel to reinforce the outer panel;
   a first excess length portion that is formed at the reinforcement member between adjacent joining portions of the reinforcement member to the outer panel, and that has excess length in a direction linking the joining portions; and
   a second excess length portion that is formed between adjacent joining portions of the first flange portion and the second flange portion, and that has excess length in a direction linking the joining portions of the first and second flange portions.

2. The vehicle frame structure of claim 1, wherein:
at least parts of the first excess length portion are disposed at positions overlapping at least parts of the second excess length portion as viewed along a vehicle width direction.

3. The vehicle frame structure of claim 2, wherein:
the joining portions between the reinforcement member and the outer panel, and the first excess length portion, are disposed further to a vehicle width direction inner side than a neutral axis of the frame formed by the inner panel and the outer panel.

4. The vehicle frame structure of claim 3, wherein:
the inner panel, the outer panel, and the reinforcement member are each configured by a high-strength steel plate.

5. The vehicle frame structure of claim 2, wherein:
the inner panel, the outer panel, and the reinforcement member are each configured by a high-strength steel plate.

6. The vehicle frame structure of claim 1, wherein:
the joining portions between the reinforcement member and the outer panel, and the first excess length portion, are disposed further to a vehicle width direction inner side than a neutral axis of the frame formed by the inner panel and the outer panel.

7. The vehicle frame structure of claim 6, wherein:
the inner panel, the outer panel, and the reinforcement member are each configured by a high-strength steel plate.

8. The vehicle frame structure of claim 1, wherein:
the inner panel, the outer panel, and the reinforcement member are each configured by a high-strength steel plate.

9. The vehicle frame structure of claim 1, wherein:
the joining portions between the first flange portion and the second flange portion are disposed at positions that do not overlap the first excess length portion as viewed along a vehicle width direction.

* * * * *